United States Patent
Aoyagi

(10) Patent No.: US 8,893,362 B2
(45) Date of Patent: Nov. 25, 2014

(54) TURRET TOOL HOLDER

(75) Inventor: Atsushi Aoyagi, Nagano (JP)

(73) Assignee: Citizen Machinery Miyano Co., Ltd., Nagano (JP)

( * ) Notice: Subject to any disclaimer, the term of this patent is extended or adjusted under 35 U.S.C. 154(b) by 903 days.

(21) Appl. No.: 13/060,654

(22) PCT Filed: Aug. 6, 2009

(86) PCT No.: PCT/JP2009/064279
§ 371 (c)(1),
(2), (4) Date: Feb. 24, 2011

(87) PCT Pub. No.: WO2010/024127
PCT Pub. Date: Mar. 4, 2010

(65) Prior Publication Data
US 2011/0154963 A1 Jun. 30, 2011

(30) Foreign Application Priority Data
Aug. 29, 2008 (JP) .................. 2008-222435

(51) Int. Cl.
*B23Q 16/10* (2006.01)
*B23B 29/32* (2006.01)
*B23P 23/02* (2006.01)

(52) U.S. Cl.
CPC ........ *B23Q 16/102* (2013.01); *B23Q 2220/002* (2013.01)
USPC ................ 29/40; 29/48.5 A; 82/159; 82/121; 74/813 L; 74/826; 192/48.91; 192/48.2; 192/99 S

(58) Field of Classification Search
CPC .................................. B23Q 16/083
USPC ............ 82/159, 120, 121; 29/39, 40, 48.5 R, 29/48.5 A; 192/48.91, 48.2, 99 S; 74/826, 74/813 L
See application file for complete search history.

(56) References Cited

U.S. PATENT DOCUMENTS 6,634,264 B1 * 10/2003 Takeuchi et al. ................ 82/118
2003/0046799 A1 3/2003 Matsumoto

FOREIGN PATENT DOCUMENTS

| EP | 1 122 011 A1 | 8/2001 |
| JP | 9-174312 | 7/1997 |
| JP | 11-254211 | 9/1999 |
| JP | 2003-71615 | 3/2003 |
| WO | WO00/10758 | 3/2000 |

OTHER PUBLICATIONS

International Search Report from the Japanese Patent Office, mailed Nov. 17, 2009, for International Application No. PCT/JP2009/064279.

* cited by examiner

*Primary Examiner* — Erica E Cadugan
(74) *Attorney, Agent, or Firm* — Finnegan, Henderson, Farabow, Garrett & Dunner, L.L.P.

(57) ABSTRACT

A turret tool holder, having structure capable of easily avoiding unnecessary free rotation of a turret, is provided. When a linearly movable shaft is moved toward a turret head section by driving a servomotor, an annular movable coupling element arranged in the turret begins to disengage from an annular fixed coupling element fixed to a support. While the movable coupling member is still engaged with the fixed coupling member, clutch teeth of a clutch member are engaged with other clutch teeth. Therefore, even when the annular movable coupling element is disengaged from the annular fixed coupling element, the turret is prevented from freely rotating by the engaged clutch teeth.

4 Claims, 7 Drawing Sheets

TURRET TOOL HOLDER

TECHNICAL FIELD

The present invention relates to a turret tool holder arranged in a machine tool such as a lathe.

BACKGROUND ART

In a machine tool such as a lathe, a rotary tool holder structure (i.e., a structure having a turret tool holder) is well known, and is adapted to support a plurality of tools, select a desired tool by rotational indexing motion, and locate the tool at a processing operation position, in order to facilitate automation and speeding up of the processing operation. For example, a turret tool holder, used in an automatic lathe, such as a NC lathe, generally has a toolslide arranged on a machine base and opposite a main spindle, a support arranged on the toolslide movable along a given coordinate axis, and a turret rotatably arranged on the support and adapted to hold a plurality of tools around a rotational axis at specified intervals.

In such a turret tool holder, after the turret carries out rotational indexing, it is necessary to firmly fix the turret on the support when a workpiece is processed by the selected tool. Therefore, generally, the turret tool holder device has engaging means adapted to lock the turret to each of the indexing positions on the support. For example, Patent Document 1 discloses a turret tool holder device having an engage/disengage drive mechanism adapted to statically hold or release a turret at an indexing position on a support and release, wherein drive force by the drive mechanism can be transmitted to the turret by means of a lever mechanism.

PRIOR ART

Patent Document

Patent Document 1 Japanese Unexamined Patent Publication (Kokai) No. 11-254211

SUMMARY OF THE INVENTION

Problem to be Solved

In the turret tool holder device of Patent Document 1, an annular movable coupling element, constituting the engaging means, is disengaged from an annular fixed coupling element, and almost simultaneously, a clutch gear is engaged with a cylindrical clutch member, whereby unnecessary free rotation of the turret, due to disengagement between the two coupling elements, is avoided. However, it is difficult to disengage the two coupling elements and simultaneously engage the clutch gear to the cylindrical clutch member, and thus it is difficult to avoid the free rotation of the turret.

Solution to Problem

In order to solve the above problem, the present invention provides a turret tool holder comprising: a turret rotatably supported on a support; a turret drive section adapted to rotate the turret; a pair of engaging means adapted to position the turret at a predetermined rotational position in an engagement state wherein an engagement element arranged on the turret and an engagement element arranged on the support are engaged with each other, and allow the turret to rotate in a disengagement state wherein the engagement elements are disengaged from each other; and transmitting means adapted to be engaged with the turret drive section so as to limit the free rotation of the turret and transmit drive power to the turret drive section, wherein the transmitting means and the engaging means are adapted to coordinate so that the transmitting means transmits the drive power to the turret drive section in the disengagement state of the engaging means, wherein the transmitting means and the engaging means are adapted to coordinate so that the engagement state is switched to the disengagement state while the free rotation of the turret is limited by the transmitting means.

The transmitting means may have a clutch member adapted to be moved in the direction of a rotational axis of the turret and adapted to detachably engaged with an engagement portion arranged on the turret drive section, and wherein the turret tool holder comprises a movement mechanism adapted to move the clutch member in the direction of the rotational axis of the turret and move the engaging element of the engaging means, simultaneously with the movement of the clutch member, at a speed lower than a movement speed of the clutch member, so that the clutch member is engaged with the engagement portion before the engaging elements of the pair of engaging means are disengaged from each other, the engagement state of the engaging means being switched to the disengagement state while the free rotation of the turret is limited by the engagement between the clutch member and the engagement portion.

The movement mechanism may comprise: a linearly movable shaft adapted to move the clutch member integrally with the linearly movable shaft; and a lever member, wherein one end of the lever member is connected to the linearly movable shaft and another end of the lever member is pivotally connected to a fixed fulcrum point, a center of the two ends of the member being connected to the engaging means.

A distance of movement of the clutch member may be determined so that the clutch member is moved in the engagement state until disengagement motion of the engaging means is completed.

Effects of Invention

According to the present invention, since the disengagement motion of the engaging means is completed while the free rotation of the turret is limited by the transmitting means, unnecessary free rotation of the turret due to the disengagement of the engaging means may be easily avoided, whereby a tool and/or external equipment may be prevented from being damaged due to unexpected rotation of the turret.

BRIEF DESCRIPTION OF THE DRAWINGS

The above and other objects, features, and advantages of the present invention will become more apparent from the description of the preferred embodiments as set forth below with reference to the accompanying drawings, wherein.

MODE FOR CARRYING OUT THE INVENTION

Figure 1:
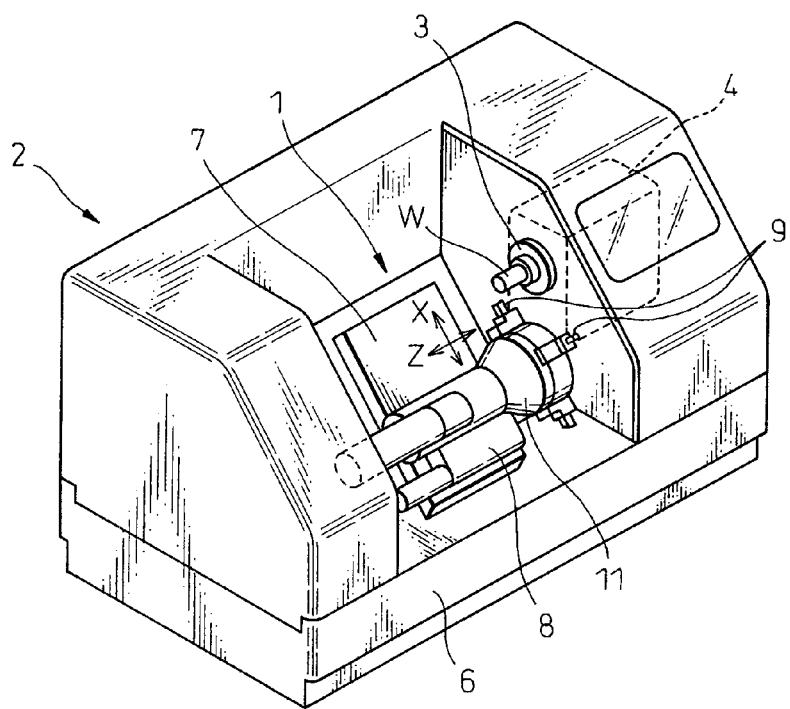
FIG. 1 is a schematic perspective view of an automatic lathe on which a turret tool holder according to the present invention is arranged.

The present invention will be described in detail below with reference to the drawings. In each drawing, the same reference numerals are used throughout the figures for each component. FIG. 1 shows a configuration wherein a turret tool holder 1 according to the invention is mounted on an automatic lathe 2 such as an NC lathe. Turret tool holder 1 is positioned opposed to a rotational main spindle 3 of automatic lathe 2. Spindle 3 is mounted on or contained in a housing-shaped spindle pedestal 4. Further, spindle 3 is configured to grip a rod-shaped workpiece W to be processed, and rotationally driven by a drive source (not shown). Turret tool holder 1 carries a plurality of tools required for processing rod-shaped workpiece W at predetermined positions, selects a desired tool by an indexing motion, depending on a part of workpiece W to be processed, and located the selected tool at a processing operation position near a front end of spindle 3 of the automatic lathe.

Turret tool holder 1 is constituted by a toolslide 7 arranged on a machine base 6 of automatic lathe 2 and opposed to spindle 3, a support pedestal 8 arranged on toolslide 7 movably along a given coordinate axis, and a turret 11 rotatably arranged on support 8 and adapted to hold at least one tool 9 around a rotational axis at specified intervals. In the embodiment of FIG. 1, toolslide 7 is adapted to be moved by means of a Z-axis feed motor (not shown) in a Z-direction generally parallel to the center axis of spindle 3, support 8 has a structure adapted to be moved by means of an X-axis feed motor (not shown) in an X-direction generally perpendicular to the center axis of spindle 3, and a tool selected from various types of tools 9 on turret 11 machines rod W in a desired shape under the two-axes feed operation.

Figure 2:
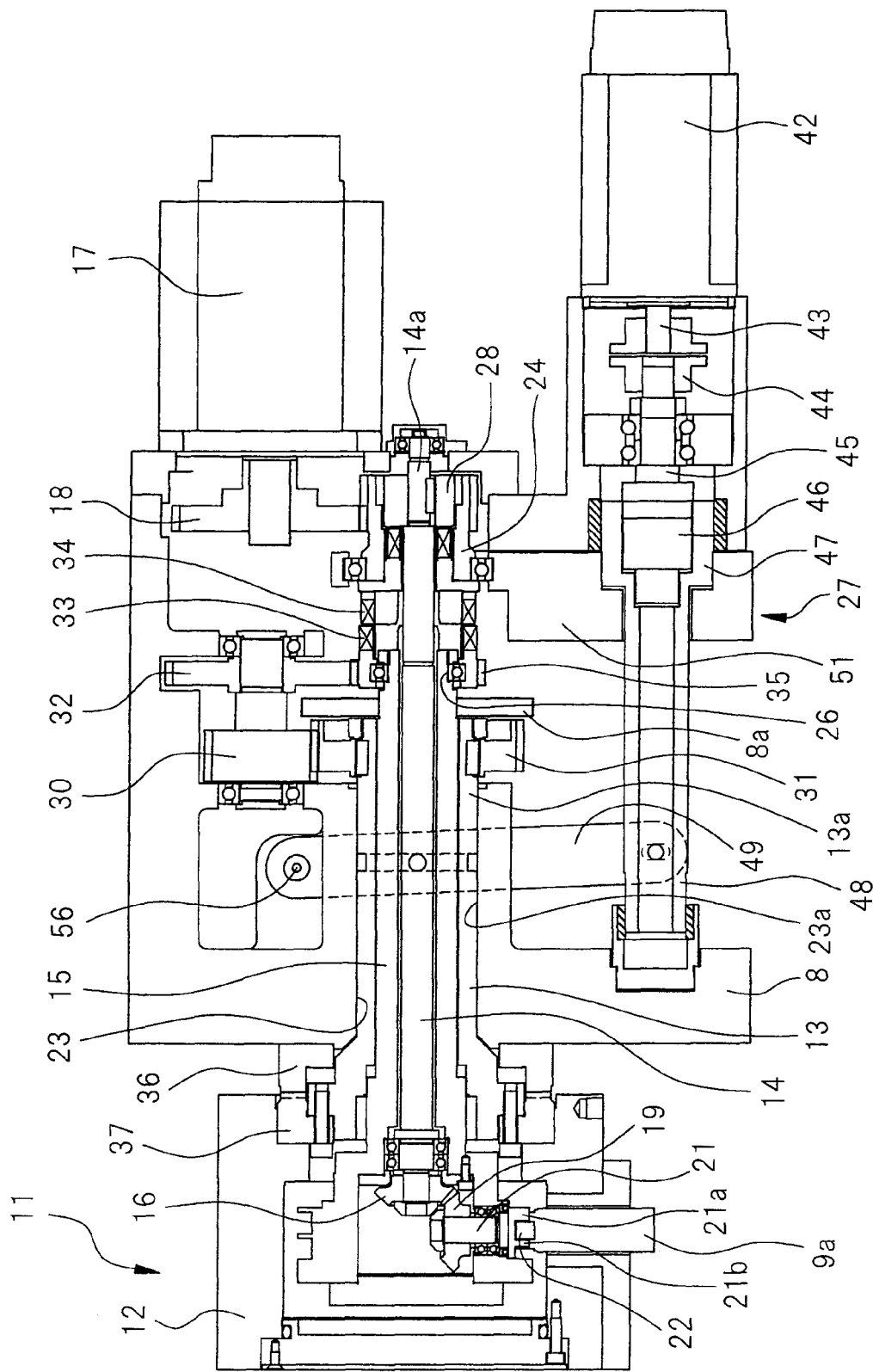
FIG. 2 is a sectional elevational view of the turret tool holder of FIG. 1, showing a state wherein drive power of a servomotor is transmitted to a pivot shaft for rotating the turret.

FIG. 2 shows a detailed structure of turret 11 rotatably supported by support 8. Turret 11 includes a hollow head section 12 having generally cylindrical or prismatic outer shape, and a hollow cylindrical shaped shaft section 13 extending, concentrically with head section 12, from one axial end surface of head section 12. Head section 12 of turret 11 outwardly projects from a front end (the right end in FIG. 1) of support 8, and a plurality of tools 9 are attached to a circumferential surface of the projecting portion of head section 12 at predetermined indexing-angular intervals. Tools 9 may include a fixed tool such as a turning tool (bite), and a rotatable tool such as a drilling tool. In the case of FIG. 2, rotatable tool 9a is used.

Rotatable tool 9a is driven by a servomotor 17 positioned at a rear end (the right end in FIG. 2) of support 8, via a drive shaft 14 and a drive gear 16 arranged within head section 12 and shaft section 13. At a support portion 8a of support pedestal 8, an intermediate shaft 15, coaxially extending through shaft section 13, is fixed. Drive shaft 14 is supported by a plurality of bearings so as to rotate coaxially with intermediate shaft 15. A rear end 14a of drive shaft 14 may be coupled to a gear 18 connected to an output shaft of servomotor 17 via a transmitting means, for example, a generally cylindrical shaped clutch member 24. Drive shaft 14 has a bevel gear at the circumference thereof. A rotatable tool attachment part 21 for tool 9a is arranged within head section 12 of turret 11. Rotatable tool attachment part 21 has a bevel gear 19 adapted to be engaged with the bevel gear of drive shaft 16, and a pair of opposing plate members 21a and 21b extending parallel to in the rotational direction of bevel gear 19. On the other hand, tool 9a has a tongue portion adapted to be inserted between plate members 21a and 21b substantially without a clearance or gap. Due to such a configuration, when drive shaft 14 is rotated by means of servomotor 17, drive gear 16 is simultaneously rotated and then tool 9a attached to tool attachment part 21 is driven or rotated.

Shaft section 13 of turret 11 is received in a turret receiving part 23 of support 8 so that shaft section 13 is rotatable and movable in the axial direction. Shaft section 13 is slidably supported by a cylindrical inner surface 23a defining turret receiving part 23 substantially without a clearance or gap in the radial direction between shaft section 13 and cylindrical inner surface 23a. A rear end portion (the right end portion in FIG. 2) of intermediate shaft 15 is received in a center hole 26 in cylindrical clutch member 24.

Figure 3:
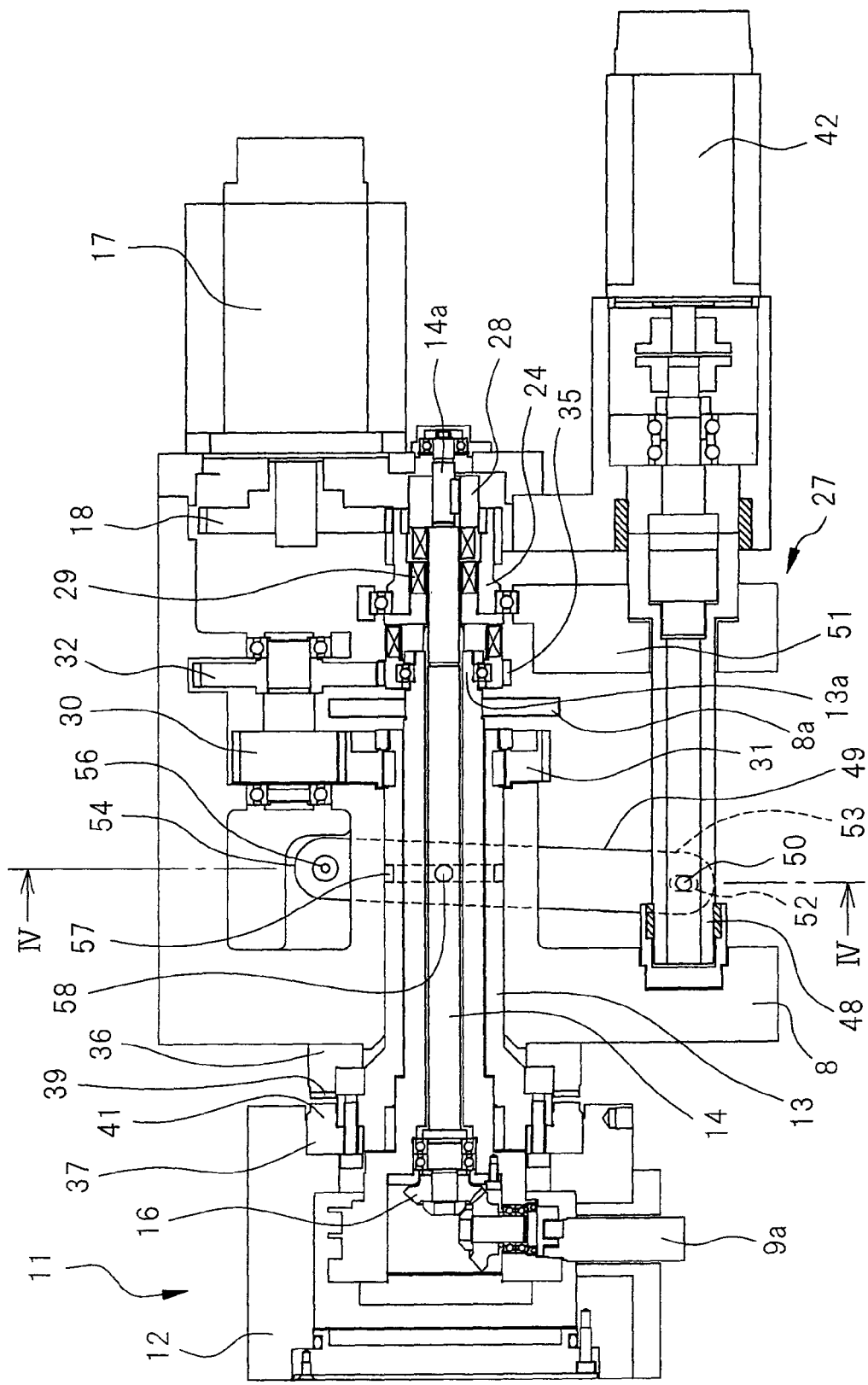
FIG. 3 is a sectional elevational view of the turret tool holder of FIG. 1, showing a state wherein drive power of the servomotor is transmitted to a shaft for rotating the turret.

FIG. 3 is similar to FIG. 2, but shows a state wherein drive power of servomotor 17 is transmitted to the turret drive section for rotating turret 11, whereas FIG. 2 shows a state wherein drive power of servomotor 17 is transmitted to shaft 14 for rotating the tool. Hereinafter, with reference to FIGS. 2 and 3, the details of clutch member 24 are explained.

Generally cylindrical clutch member 24 is positioned, coaxially with drive shaft 14, at an end of drive shaft 14 opposed to head section 12. Clutch member 24 is rotatably supported by a connecting member 51 of a movement mechanism 27 (described below) so that clutch member 24 is moved between a first position (the position of FIG. 2) and a second position (the position of FIG. 3) along the axial direction of shaft section 13. A rear end (the right end in FIGS. 2 and 3) of clutch member 24 has a clutch gear 29 adapted to be engaged with a clutch gear 28 fixed to rear end 14a of drive shaft 14 when the clutch member is positioned at the first position, and a front end (the left end in FIGS. 2 and 3) of clutch member 24 has a clutch gear 34 adapted to be engaged with a clutch gear 33 integrally formed with a gear 35 rotatably supported at the rear end of intermediate shaft 15 when the clutch member is positioned at the second position. Clutch member 24 is not engaged with clutch gear 33 at the first position, and is not engaged with clutch gear 28 at the second position. As a member constituting the clutch gear, a member having an annular end surface, on which a plurality of tooth grooves each extending in the radial direction of the annular end surface are formed, may be used. In addition, a gear 30 adapted to be engaged with a gear 31 fixed to rear end 13a of shaft section 13 and a gear 32 adapted to be engaged with gear 35 are supported by support 8 so that gears 30 and 32 are integrally rotated.

When clutch member 24 is positioned at the first position (FIG. 2), since drive power of servomotor 17 is transmitted to drive shaft 14 via gear 18 and clutch gears 29 and 28, drive shaft rotates and then tool 9a is rotated by means of gears 16 and 19. On the other hand, when clutch member 24 is positioned at the second position (FIG. 3), since drive power of servomotor 17 is transmitted to shaft 13 of turret 11 via gear 18, clutch gears 33 and 34 and gears 35, 32, 30 and 31, head section 12 of turret 11 rotates and then indexing motion of turret 11 is carried out.

Next, an engaging means, adapted to prevent turret 11 from unnecessarily rotating after the indexing motion, is explained. As shown in FIG. 3, turret tool holder 1 has a mutual engagement mechanism including an annular fixed coupling element or engagement element 36 fixed to support 8 and an annular movable coupling element or engagement element 37 fixed to turret 11. Annular fixed coupling element 36 has an engaging clutch structure and is fixed to support 8 in the proximity of and opening at an axial front end of turret receiving part 23. Annular movable coupling element 37 has also an engaging clutch structure and is fixed to turret 11 in the proximity of a connection between head section 12 and shaft section 13.

At a front end surface (the left end surface in FIG. 3) of annular fixed coupling element 36, a plurality of teeth 39 are radially formed at a predetermined intervals, and at a rear end surface (the right end surface in FIG. 3) of annular movable coupling element 37, a plurality of teeth 41, adapted to be engaged with teeth 39, are radially formed at a predetermined intervals. Annular coupling elements 36 and 37 are positioned so that teeth 39 and teeth 41 are opposite of each other in the axial direction and may be engaged with or disengaged from each other. When turret 11 is not rotated, annular movable coupling element 37 is moved in the axial direction with turret 11, whereby annular coupling elements 36 and 37 are engaged with or disengaged from each other. As the mutual engagement mechanism, a Curvic Coupling™ may be used.

Next, the details of movement mechanism 27, for carrying out the reciprocating motion of clutch member 24 and the engagement/disengagement motion of annular coupling elements 36 and 37, are explained. As shown in FIG. 2, movement mechanism 27 includes a servomotor 42, a ball screw 45 connected to a rotation shaft 43 of servomotor 42 via a coupling structure 44, a nut 46 threadably engaged with ball screw 45, a linearly movable shaft 47 integrally attached to nut 46, a connecting member 51 fixed to linearly movable shaft 47, and a lever member 49 pivotally connected to a front end 48 of linearly movable shaft 47. Shaft 47 extends parallel to shaft section 13. Connecting member 51 extends generally perpendicular to shaft section 13. Shaft 47 and clutch member 24 are integrally connected to each other via connecting member 51. Therefore, when shaft 47 is moved in the axial direction by means of servomotor 42, clutch member 24 is also moved in the axial direction by the distance same as the movement distance of shaft 47.

Figure 4:
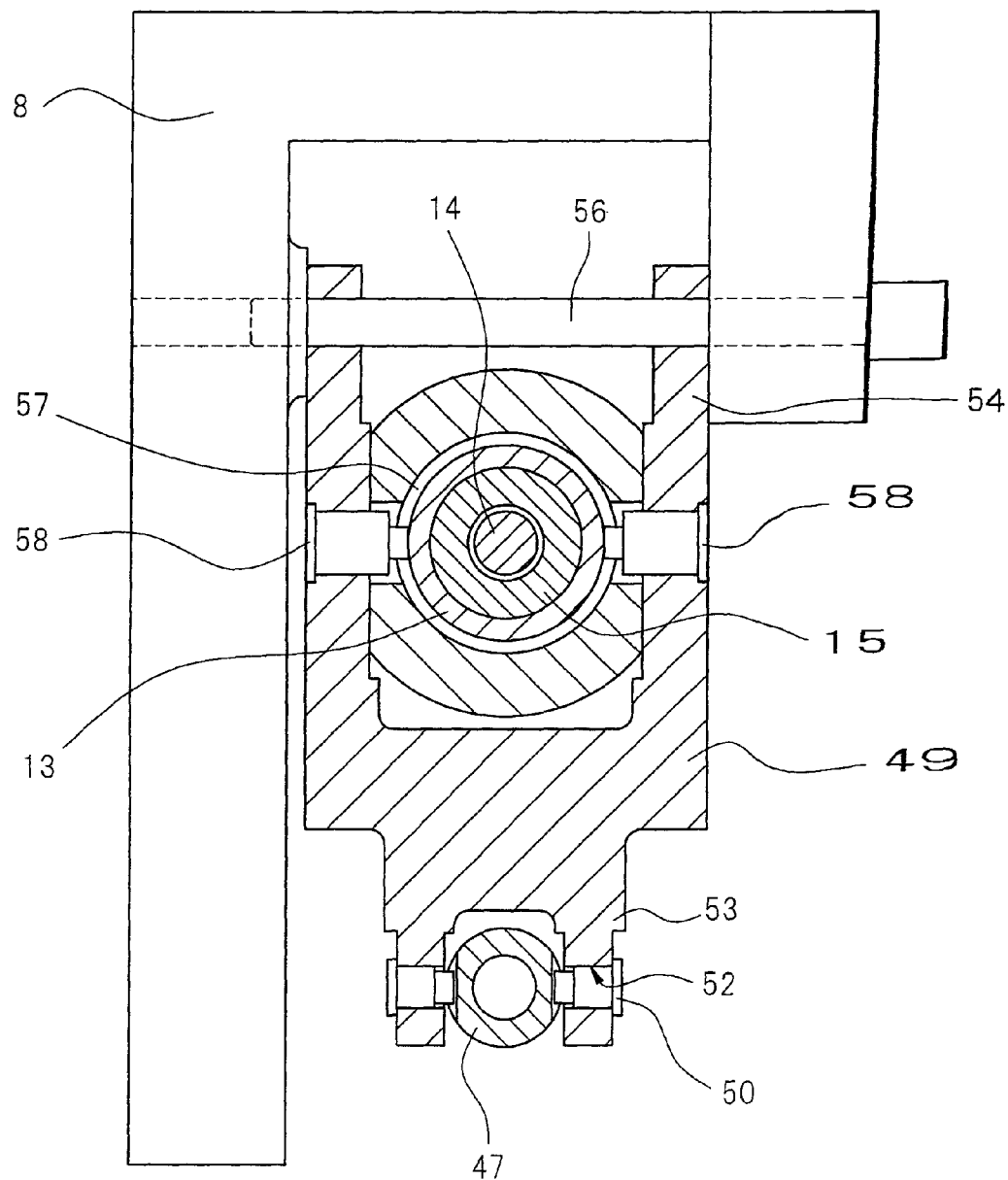
FIG. 4 is a cross sectional view along IV-IV line of FIG. 3.

As shown in FIG. 3 and FIG. 4 (or a cross sectional view along IV-IV line of FIG. 3), lever member 49 is a rod-shaped or elongated plate member extending generally perpendicular to shaft section 13 of turret 11. One end 53 of lever member 49 has an engagement hole 52 adapted to be engaged with a pin 50 arranged on front end 48 of linearly movable shaft 47, and the other end 54 of lever member 49 is pivotally connected to a fulcrum 56 arranged on a part of support 8 opposed to end 53 of lever member 49 in relation to shaft section 13. Lever member 49 further has a pin 58 adapted to be engaged with an annular groove 57 formed the outer surface of shaft section 13. It is preferable that engagement hole 52 of lever member 49 is an elongated hole extending in the longitudinal direction of lever member 49. By arranging lever member 49 so that the both ends of the lever member is positioned at either side in relation to shaft section 13, the tool holder may be compact.

In the embodiment, when linear movable shaft 47 is moved in the axial direction by means of servomotor 42, shaft section 13 is also moved in the same direction by a distance smaller than the movement distance of linearly movable shaft 47. Concretely, the movement distance of shaft section 13 varies depending on a ratio of the distance between fulcrum 56 and pin 58 to the distance between fulcrum 56 and pin 50 (approximately 1:3 in the illustrated embodiment). In other words, the movement distance per unit of time (or the movement speed) of linearly movable shaft 47 is approximately three times of that of turret shaft section 13, and thus the movement speed of clutch member 24, adapted to be moved in conjunction with shaft 47, is also approximately three times of that of shaft section 13. Although the ratio of the movement speed is approximately 1:3, it is only necessary that the movement speed of linearly movable shaft 47 is larger than that of shaft section 13.

In turret tool holder 1, servomotor 17 for driving rotatable tool 9a also functions as a rotary drive source for the indexing motion of turret 11. Therefore, during the indexing motion of turret 11, it is necessary that turret 11 is operably connected to servomotor 17 during the indexing motion of turret 11 and that turret 11 is operably disconnected from servomotor 17 during the operation or rotation of rotatable tool 9a. In the embodiment, such a switching operation is carried out by the function of cylindrical clutch member 24.

In the state of FIG. 2, teeth 39 of annular fixed coupling element 36 and teeth 41 of annular movable coupling element 37 are engaged with each other. Therefore, annular movable coupling element 37 is prevented from rotating relative to annular fixed coupling element 36, whereby turret 11 is prevented from rotating relative to support 8. In this state, annular movable coupling element 37 with turret 11 is positioned at an engagement position at the rear end (the right end in the drawing) within an axial movable range thereof.

While annular movable coupling element 37 and turret 11 are positioned at the engagement position, rod-shaped workpiece W gripped by spindle 3 is processed by means of rotatable tool 9a attached to head section 12 of turret 11. During the processing, turret 11 is firmly fixed to support 8 so that desired processing accuracy is obtained regardless of stress applied to tool 9a.

When annular movable coupling element 37 and turret 11 are moved forwardly (to the left direction in FIG. 2) from the engagement position shown in FIG. 2 to a disengagement position as shown in FIG. 3, by means of movement mechanism 27, teeth 41 of annular movable coupling element 37 is disengaged from teeth of 39 of annular fixed coupling element 36. As a result, annular movable coupling element 37 may be freely rotated relative to annular fixed coupling element 36. In other words, turret 11 is released from support 8 and turret 11 can carry out the indexing motion.

When linearly movable shaft 47 is moved toward the turret by means of servomotor 42 while turret 11 or clutch member 24 is not rotated, clutch teeth 29 of clutch member 24 are disengaged from clutch teeth 28 and clutch teeth 34 are engaged with clutch teeth 33. Since servomotor 17 applies rotational force to head section 12 of turret 11 via gears 35, 32, 30, 31 and shaft section 13 while clutch teeth 34 are engaged with clutch teeth 33, turret 11 can carry out the indexing motion by means of servomotor 17 in turret tool holder.

On the other hand, when linearly movable shaft 47 is moved away from the turret by means of servomotor 42, clutch teeth 33 of clutch member 24 are disengaged from clutch teeth 34 and clutch teeth 29 are engaged with clutch teeth 28. As such, due to the movement of linearly movable shaft 47 in the axial direction, coupling engagement/disengagement motion for fixing turret 11 to support 8 and clutch engagement/disengagement motion for switching the object driven by servomotor 17 are carried out in conjunction with each other.

As described above, in turret tool holder 1, while turret 11 is fixed or held by support 8, servomotor 17 is used to drive or rotate tool 9a only, but after turret 11 is released, servomotor 17 is used to rotate turret 11 so as to carry out the indexing motion. Therefore, it is not necessary to prepare another servomotor for carrying out the indexing motion of turret 11 in addition to the servomotor for rotating the tool, whereby the turret tool holder may be compact.

In the present invention, turret 11 is prevented from freely rotating when annular movable coupling element 37 is disengaged from annular fixed coupling element 36. Hereinafter, the prevention of the free rotation of the turret is explained with reference to FIGS. 5 and 6.

Figure 5:
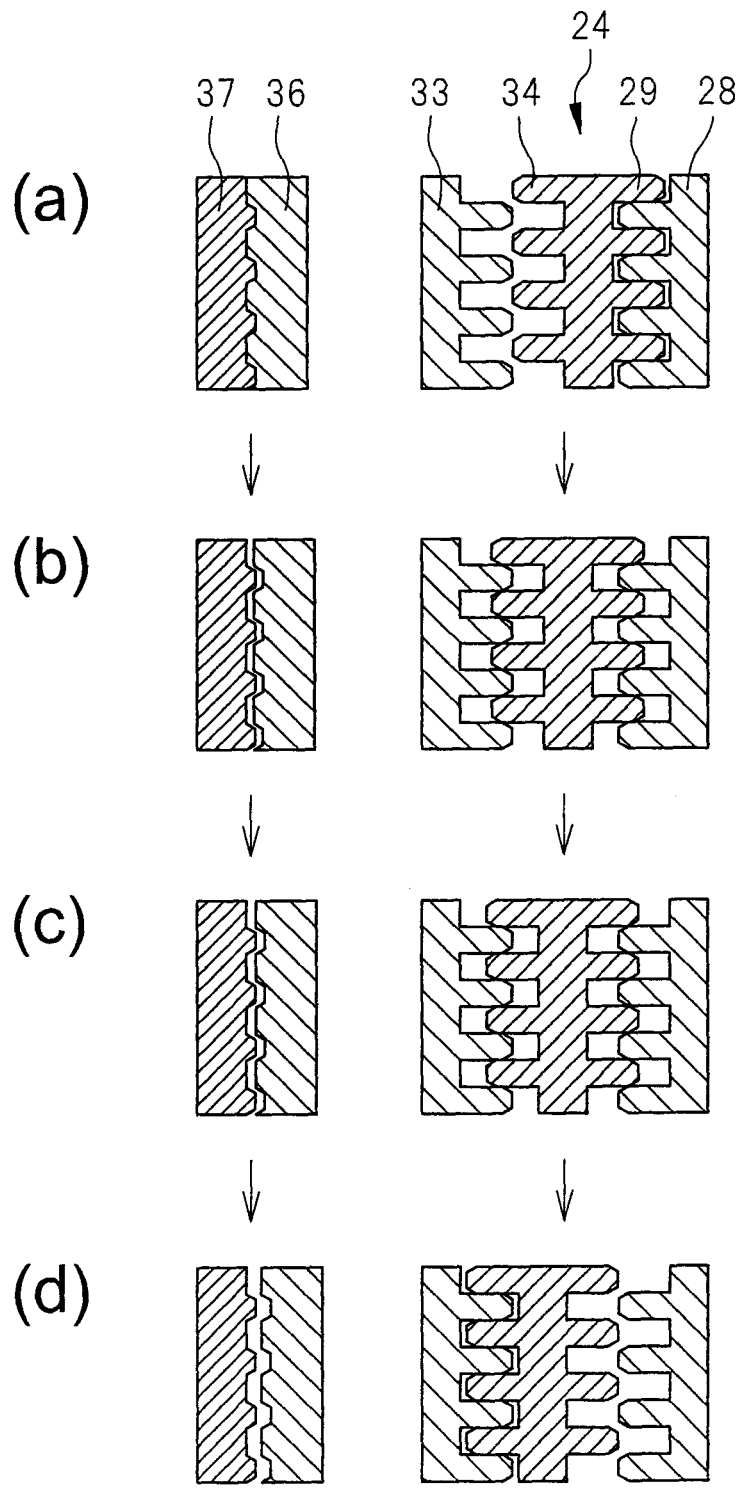
FIG. 5 is a view showing the positional relationship between coupling elements associated with a clutch member and the positional relationship between coupling elements associated with a turret in a time series manner, according to the invention.
Figure 6:
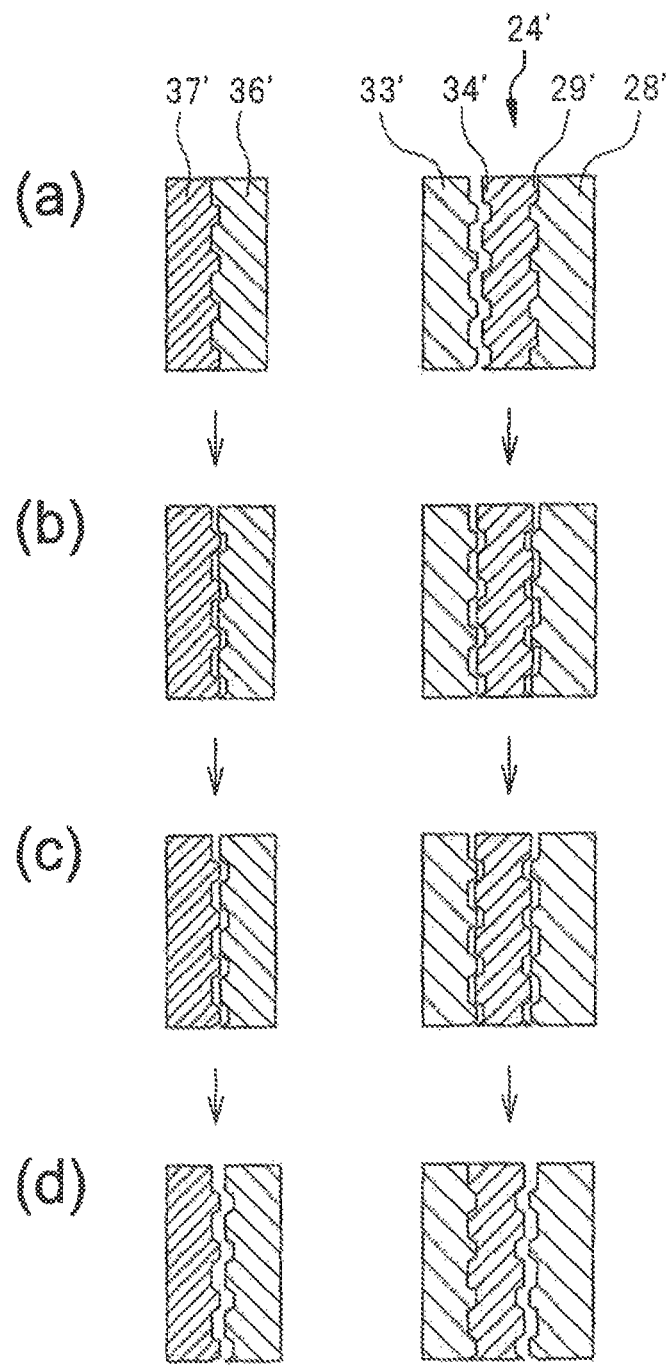
FIG. 6 is a view showing the positional relationship between coupling elements associated with a clutch member and the positional relationship between coupling elements associated with a turret in a time series manner, according to the prior art.

FIG. 5 schematically show the positional relationship between clutch member 24, clutch teeth 28 and 33 engaged with clutch teeth 29 and teeth 34 of clutch member 24, respectively; and the positional relationship between annular coupling elements 36 and 37. Concretely, (a) and (d) in FIG. 5 correspond to the states of FIGS. 2 and 3, respectively, and (b) and (c) in FIG. 5 indicate intermediate states between them. Further, by way of comparison with the prior art such as Patent Document 1, (a) to (d) in FIG. 6 show the positional relationship between elements corresponds to clutch member 24 and annular coupling members 36 and 37. In FIG. 6, "'" is added to reference numeral of each element which corresponds to each element of FIG. 5.

From the state of (a) in FIG. 5, when linearly movable shaft 47 is moved toward turret head section 12 (to the left side in FIGS. 2 and 3) by servomotor 42, annular movable coupling element 37 arranged in turret 11 begins to disengage from annular fixed coupling element 36 fixed to support 8. As shown in (b) in FIG. 5, while annular movable coupling element 37 is still engaged with annular fixed coupling element 36, clutch teeth 34 of clutch member 24 are engaged with clutch teeth 33. Therefore, when annular movable coupling element 37 is disengaged from annular fixed coupling element 36 as shown in (c) in FIG. 5, turret 11 is prevent from freely rotating due to the engagement between clutch teeth 33 and clutch teeth 34. In addition, the operation of (a) to (d) is usually carried out while servomotor 17 is stopped, and thus clutch teeth 29 may be engaged with clutch teeth 28 at the stated of (b) in FIG. 5.

Subsequently, the relative displacement between each element continues until the positional relationship becomes the state of (d) in FIG. 5. In this regard, as described above, the movement speed of clutch member 24 is larger than (three times in the illustrated embodiment) the movement speed of annular movable coupling element 37, and thus the movement distance of clutch member 24 from the state of (a) to the state of (d) is set larger than the movement distance of annular movable coupling element 37 depending on the difference of movement speed. Due to such a configuration, clutch teeth 29 and 34 of clutch member 24 and clutch teeth 28 and 33 adapted to be engaged with clutch teeth 29 and 34 may have a relatively long size in the movement direction thereof depending on the difference of movement speed, whereby the state of (b) in FIG. 5 can be assuredly realized.

On the other hand, in the prior art as shown in FIG. 6, both the timing of switching engagement/disengagement between coupling elements 36' and 37' and the timing of switching in clutch member 24' exist between the states of (b) and (c). Therefore, a state, wherein coupling element 37' is disengaged from coupling elements 36' and clutch teeth 34' are disengaged from clutch teeth 33' (i.e., the turret may freely rotate), cannot be always eliminated. However, in the invention as shown in FIG. 5, since clutch teeth 34 are engaged with clutch teeth 33 while annular movable coupling element 37 is engaged with annular fixed coupling element 36 (i.e., the state of (b) in FIG. 5), the free rotation of turret 11 is assuredly avoided.

Figure 7:
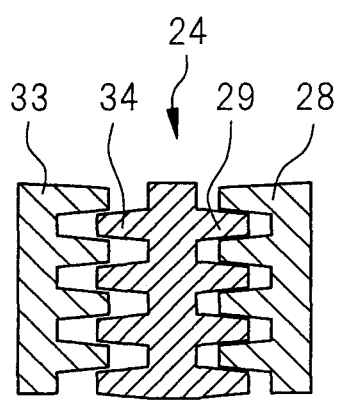
FIG. 7 is a view showing a modification of the clutch member.

FIG. 7 shows a modification of the clutch teeth of FIG. 5. In the example of FIG. 5, clutch teeth 29 and 34 of clutch member 24 and clutch teeth 28 and 33 engaged therewith are both parallel teeth. On the other hand, any of the clutch teeth are tapered teeth each having a portion which inclines relative to the movement direction of the clutch member. In the case of the tapered teeth, there may be slip or backlash between the engaged clutch teeth at the intermediate state as shown in (b) or (c) in FIG. 5. However, similarly to the case of FIG. 5, clutch teeth 34 of clutch member 24 are engaged with clutch teeth 33 while annular movable coupling element 37 is engaged with annular fixed coupling element 36, and even when annular movable coupling element 37 is disengaged from annular fixed coupling element 36, the free rotation of turret 11 is assuredly avoided by the engagement between clutch teeth 33 and 34.

According to the present invention, the free rotation of turret 11 is assuredly avoided when the transmission of drive force of servomotor 17 is switched from drive shaft 14 to turret shaft section 13 (or vice versa) by means of clutch member 24. This is particularly advantageous when the tool attached to turret 11 is a rotatable tool such as tool 9a.

The invention claimed is:

1. A turret tool holder comprising:
   a turret rotatably supported on a support;
   a turret drive section adapted to rotate the turret;
   a pair of engaging means adapted to position the turret at a predetermined rotational position in an engagement state wherein an engagement element arranged on the turret and an engagement element arranged on the support are engaged with each other, and allow the turret to rotate in a disengagement state wherein the engagement elements are disengaged from each other; and
   transmitting means adapted to be engaged with the turret drive section so as to limit the free rotation of the turret and transmit drive power to the turret drive section, wherein the transmitting means and the engaging means are adapted to coordinate so that the transmitting means transmits the drive power to the turret drive section in the disengagement state of the engaging means
   wherein the transmitting means has a movable clutch member adapted to be detachably engaged with an engagement portion arranged on the turret drive section, and wherein the turret tool holder comprises a movement mechanism adapted to simultaneously translate the clutch member and one of the engagement elements so that the clutch member is engaged with the engagement portion before the engagement elements of the pair of engaging means are disengaged from each other, the engagement state of the engaging means being switched to the disengagement state while the free rotation of the turret is limited by the engagement between the clutch member and the engagement portion.

2. The turret tool holder as set forth in claim 1, wherein the clutch member is adapted to be moved in the direction of a rotational axis of the turret, and wherein the movement mechanism is adapted to move the clutch member in the direction of the rotational axis of the turret and move the one of the engagement elements of the engaging means, simultaneously with the movement of the clutch member, at a speed lower than a movement speed of the clutch member, so that the clutch member is engaged with the engagement portion before the engagement elements of the pair of engaging means are disengaged from each other, the engagement state of the engaging means being switched to the disengagement state while the free rotation of the turret is limited by the engagement between the clutch member and the engagement portion.

3. The turret tool holder as set forth in claim 2, wherein the movement mechanism comprises:
   a linearly movable shaft adapted to move the clutch member integrally with the linearly movable shaft; and
   a lever member, wherein one end of the lever member is connected to the linearly movable shaft and another end of the lever member is pivotally connected to a fixed fulcrum point, a center of the two ends of the lever member being connected to the engaging means.

4. The turret tool holder as set forth in claim 2 or 3, wherein a distance of movement of the clutch member is determined so that the clutch member is moved while the engaging means are in the engagement state until disengagement motion of the engaging means is completed.

* * * * *